(12) United States Patent  
Narayanamurthy et al.

(10) Patent No.: US 7,827,807 B2  
(45) Date of Patent: Nov. 9, 2010

(54) REFRIGERANT-BASED THERMAL ENERGY STORAGE AND COOLING SYSTEM WITH ENHANCED HEAT EXCHANGE CAPABILITY

(75) Inventors: Ramachandran Narayanamurthy, Loveland, CO (US); Robert Scott Hicks, LaPorte, CO (US)

(73) Assignee: Ice Energy, Inc., Windsor, CO (US)

( * ) Notice: Subject to any disclaimer, the term of this patent is extended or adjusted under 35 U.S.C. 154(b) by 86 days.

(21) Appl. No.: 12/366,784

(22) Filed: Feb. 6, 2009

(65) Prior Publication Data

US 2009/0183518 A1 Jul. 23, 2009

Related U.S. Application Data

(62) Division of application No. 11/138,762, filed on May 25, 2005, now Pat. No. 7,503,185.

(60) Provisional application No. 60/574,449, filed on May 25, 2004.

(51) Int. Cl.  
*F25B 25/00* (2006.01)

(52) U.S. Cl. .................. 62/59; 62/332; 62/434

(58) Field of Classification Search .............. 62/59, 62/332–333, 434–435  
See application file for complete search history.

(56) References Cited

U.S. PATENT DOCUMENTS 2,512,576 A 6/1950 Cross

| 3,156,101 A | 11/1964 | McGuffey |
| 3,746,084 A | 7/1973 | Ostbo |
| 4,073,306 A | 2/1978 | Neyer |
| 4,294,078 A | 10/1981 | MacCracken |
| 4,403,645 A | 9/1983 | MacCracken |
| 4,565,069 A | 1/1986 | MacCracken |

(Continued)

FOREIGN PATENT DOCUMENTS

DE 10057834 9/1957

(Continued)

OTHER PUBLICATIONS

U.S. Appl. No. 11/112,861, filed Apr. 22, 2005, Ramachandran Narayanamurthy et al.

(Continued)

*Primary Examiner*—William E Tapolcai  
(74) *Attorney, Agent, or Firm*—Paul M. Thompson; Cochran Freund & Young LLC

(57) ABSTRACT

Disclosed is a method and device to increase the cooling load that can be provided by a refrigerant-based thermal energy storage and cooling system with an improved arrangement of heat exchangers. This load increase is accomplished by circulating cold water surrounding a block of ice, used as the thermal energy storage medium, through a secondary heat exchanger where it condenses refrigerant vapor returning from a load. The refrigerant is then circulated through a primary heat exchanger within the block of ice where it is further cooled and condensed. This system is known as an internal/external melt system because the thermal energy, stored in the form of ice, is melted internally by a primary heat exchanger and externally by circulating cold water from the periphery of the block through a secondary heat exchanger.

16 Claims, 5 Drawing Sheets

U.S. PATENT DOCUMENTS

| | | | |
|---|---|---|---|
| 4,608,836 A | 9/1986 | MacCracken et al. |
| 4,609,036 A | 9/1986 | Schrader |
| 4,619,317 A | 10/1986 | Disselbeck et al. |
| 4,735,064 A | 4/1988 | Fischer |
| 4,893,476 A | 1/1990 | Bos et al. |
| 4,916,916 A | 4/1990 | Fischer |
| 4,940,079 A | 7/1990 | Best et al. |
| 4,964,279 A | 10/1990 | Osborne |
| 5,005,368 A | 4/1991 | MacCracken et al. |
| 5,109,920 A | 5/1992 | Merryfull |
| 5,211,029 A | 5/1993 | Uselton et al. |
| 5,237,832 A | 8/1993 | Alston |
| 5,255,526 A | 10/1993 | Fischer |
| 5,366,153 A | 11/1994 | Swenson et al. |
| 5,383,339 A | 1/1995 | McCloskey et al. |
| 5,423,378 A | 6/1995 | Dillenbeck et al. |
| 5,467,812 A | 11/1995 | Dean et al. |
| 5,598,720 A | 2/1997 | MacCracken et al. |
| 5,647,225 A | 7/1997 | Fischer et al. |
| 5,678,626 A | 10/1997 | Gilles |
| 5,682,752 A | 11/1997 | Dean |
| 5,720,178 A | 2/1998 | Silvetti et al. |
| 5,927,101 A | 7/1999 | Oh |
| 6,112,543 A | 9/2000 | Feuerecker et al. |
| 6,158,499 A | 12/2000 | Rhodes et al. |
| 6,247,522 B1 | 6/2001 | Kaplan et al. |
| 6,250,098 B1 | 6/2001 | Huang |
| 6,260,376 B1 | 7/2001 | Khelifa et al. |
| D501,490 S | 2/2005 | Kerrigan |
| 7,124,594 B2 | 10/2006 | McRell |
| 7,152,413 B1 | 12/2006 | Anderson |
| 7,162,878 B2 | 1/2007 | Narayanamurthy et al. |
| 2002/0162342 A1 | 11/2002 | Weng et al. |

FOREIGN PATENT DOCUMENTS

| | | |
|---|---|---|
| DE | 29823175 | 7/1999 |
| DE | 19831127 | 3/2001 |
| DE | 1015019 | 6/2002 |
| EP | 0641978 | 3/1995 |
| JP | 58217133 | 12/1983 |
| JP | A-2000-266368 | 1/1996 |
| JP | 8-226682 | 9/1996 |
| JP | A-2001-296068 | 12/1998 |
| JP | 8014628 | 9/2000 |
| JP | 10339483 A | 9/2000 |
| JP | A-2000-249420 | 10/2001 |

OTHER PUBLICATIONS

U.S. Appl. No. 11/138,762, Non-Final Office Action, pp. 1-15.
U.S. Appl. No. 11/138,762, Final Office Action, pp. 1-6.

REFRIGERANT-BASED THERMAL ENERGY STORAGE AND COOLING SYSTEM WITH ENHANCED HEAT EXCHANGE CAPABILITY

CROSS REFERENCE TO RELATED APPLICATIONS

This application is a divisional of U.S. patent application Ser. No. 11/138,762, filed on May 25, 2005. This application is based upon and claims the benefit of U.S. provisional application No. 60/574,449, entitled "Refrigerant-Based Energy Storage and Cooling System with Enhanced Heat Exchange Capability", filed May 25, 2004, the entire disclosure of which is hereby specifically incorporated by reference for all that it discloses and teaches.

BACKGROUND OF THE INVENTION

1. Field of the Invention

The present invention relates generally to systems providing stored thermal energy in the form of ice, and more specifically to ice storage cooling and refrigeration systems.

2. Description of the Background

With the increasing demands on peak demand power consumption, ice storage has been utilized to shift air conditioning power loads to off-peak times and rates. A need exists not only for load shifting from peak to off-peak periods, but also for increases in air conditioning unit capacity and efficiency. Current air conditioning units having energy storage systems have had limited success due to several deficiencies including reliance on water chillers that are practical only in large commercial buildings and have difficulty achieving high-efficiency. In order to commercialize advantages of thermal energy storage in large and small commercial buildings, thermal energy storage systems must have minimal manufacturing costs, maintain maximum efficiency under varying operating conditions, emanate simplicity in the refrigerant management design, and maintain flexibility in multiple refrigeration or air conditioning applications.

Systems for providing thermal stored energy have been previously contemplated in U.S. Pat. Nos. 4,735,064, 4,916,916, both issued to Harry Fischer, U.S. Pat. No. 5,647,225 issued to Fischer et al, and U.S. patent application Ser. No. 10/967,114 filled Oct. 15, 2004 by Narayanamurthy et al. All of these patents utilize ice storage to shift air conditioning loads from peak to off-peak electric rates to provide economic justification and are hereby incorporated by reference herein for all they teach and disclose.

SUMMARY OF THE INVENTION

An embodiment of the present invention may comprise a refrigerant-based thermal energy storage and cooling system comprising: a condensing unit, the condensing unit comprising a compressor and a condenser; a refrigerant management unit connected to the condensing unit, the refrigerant management unit that regulates, accumulates and pumps refrigerant; a load heat exchanger connected to the refrigerant management unit that provides cooling to a cooling load by increasing the enthalpy of the refrigerant; a tank filled with a fluid capable of a phase change between liquid and solid and containing a primary heat exchanger therein, the primary heat exchanger being connected to the refrigerant management unit that uses the refrigerant from the refrigerant management unit to cool the fluid and to freeze at least a portion of the fluid within the tank; and, a secondary heat exchanger connected to the load heat exchanger that facilitates thermal contact between the cooled fluid and the refrigerant thereby reducing the enthalpy of the refrigerant, and returns the warmed fluid to the tank.

An embodiment of the present invention may also comprise a method of providing load cooling with a refrigerant-based thermal energy storage and cooling system comprising the steps of: condensing a first expanded refrigerant with a condensing unit to create a first condensed refrigerant; supplying the first condensed refrigerant to an evaporating unit constrained within a tank filled with a fluid capable of a phase change between liquid and solid; expanding the first condensed refrigerant during a first time period within the evaporating unit to freeze a portion of the fluid within the tank and create a cooled fluid, a frozen fluid and a second expanded refrigerant; circulating at least a portion of the cooled fluid through a secondary heat exchanger in a second time period to reduce the enthalpy of the second expanded refrigerant and create a lower enthalpy refrigerant; circulating the lower enthalpy refrigerant through the evaporating unit within the frozen fluid to condense the lower enthalpy refrigerant and create a second condensed refrigerant; and, expanding the second condensed refrigerant to provide the load cooling.

DETAILED DESCRIPTION OF THE INVENTION

Figure 1:
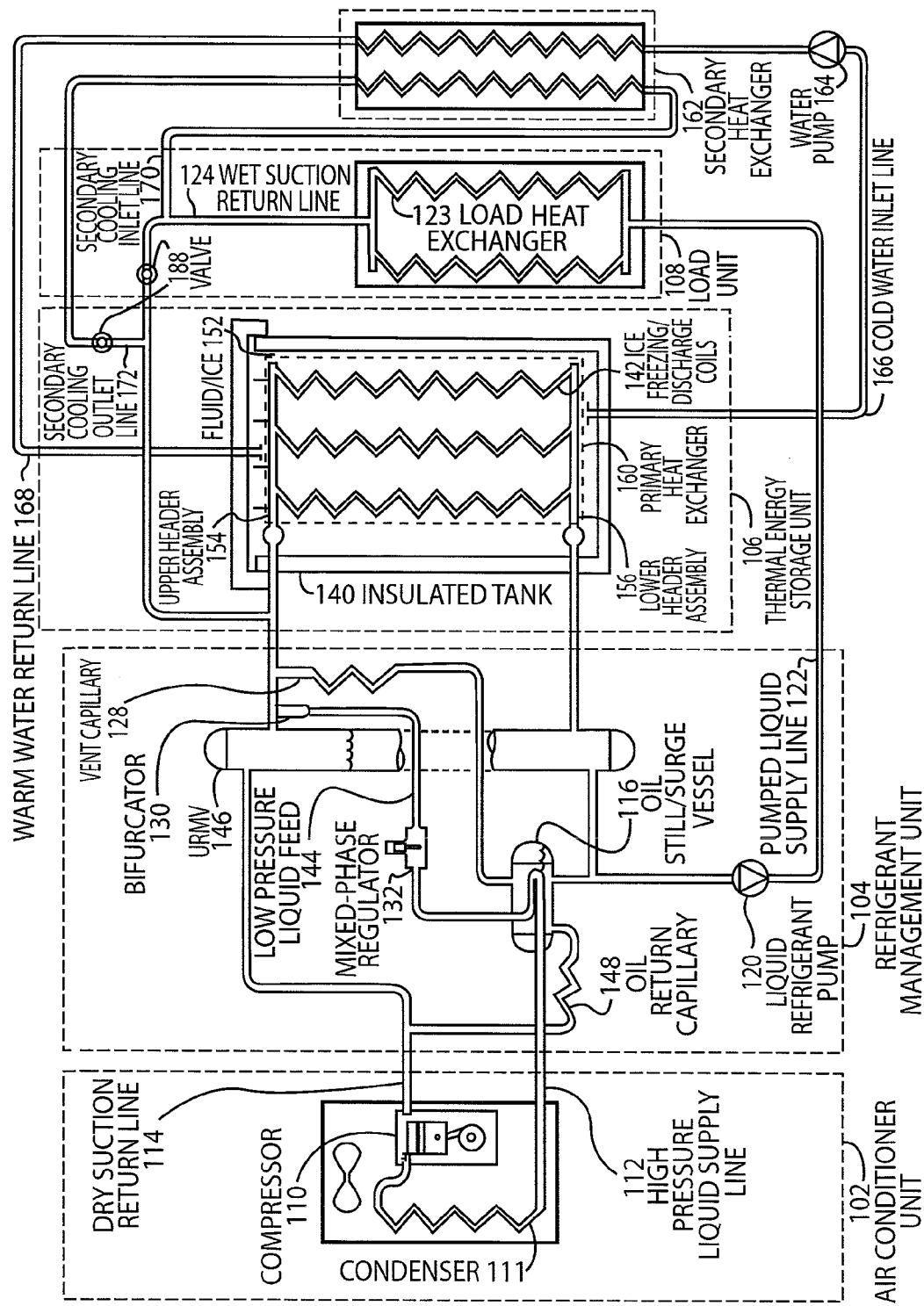
FIG. 1 illustrates an embodiment of a refrigerant-based thermal energy storage and cooling system with enhanced heat exchange capability.

While this invention is susceptible to embodiment in many different forms, there is shown in the drawings and will be described herein in detail specific embodiments thereof with the understanding that the present disclosure is to be considered as an exemplification of the principles of the invention and is not to be limited to the specific embodiments described.

As shown in FIG. 1, an embodiment of a refrigerant-based thermal energy storage and cooling system is depicted comprising the five major components that define the system. The air conditioner unit 102 utilizes a compressor 110 and a condenser 111 to produce high-pressure liquid refrigerant delivered through a high-pressure liquid supply line 112 to the refrigeration management unit 104. The refrigeration management unit 104 is connected to a thermal energy storage unit 106 comprising an insulated tank 140 filled with fluid (e.g. water) and ice-making coils 142. The air conditioner unit 102, the refrigeration management unit 104 and the thermal energy storage unit 106 act in concert to provide efficient multi-mode cooling to the load unit 108 comprising a load heat exchanger 108 (indoor cooling coil assembly) and thereby perform the functions of the principal modes of operation of the system. A circulation loop to a secondary heat exchanger 162 acts to circulate and destratify fluid 152 within the insulated tank 140 and draw heat from refrigerant leaving the load heat exchanger 123.

As further illustrated in FIG. 1, during one time period (ice building) the air conditioner unit 102 produces high-pressure liquid refrigerant delivered through a high-pressure liquid supply line 112 to the refrigeration management unit 104. The high-pressure liquid supply line 112 passes through an oil still/surge vessel 116 forming a heat exchanger therein. The oil still/surge vessel 116 serves a trilogy of purposes: it is used to concentrate the oil in the low-pressure refrigerant to be returned to the compressor 110 through the oil return capillary 148 and dry suction return 114; it is used to store liquid refrigerant during the second time period (cooling mode); and, it is used to prevent a liquid floodback to compressor 110 immediately following compressor 110 startup due to a rapid swelling of refrigerant within the ice freezing/discharge coils 142 and the universal refrigerant management vessel 146. Without the oil still/surge vessel 116, oil would remain in the system and not return to the compressor 110, ultimately causing the compressor 110 to seize due to lack of oil, and the heat exchangers also become less effective due to fouling. Without the oil still/surge vessel 116, it may not be possible to adequately drain liquid refrigerant from the ice freezing/discharge coils during the second time period (cooling mode) in order to utilize nearly the entire heat transfer surface inside the ice freezing/discharge coils 142 for condensing the refrigerant vapor returning from the load heat exchanger 123.

Cold liquid refrigerant comes into contact with an internal heat exchanger that is inside of oil still/surge vessel 116, a high-pressure (warm) liquid resides inside of the internal heat exchanger. A vapor forms which rises to the top of the still/surge vessel 116 and passes out vent capillary 128 (or an orifice), to be re-introduced into the wet suction return 124. The length and internal diameter of the vent capillary 128 limits the pressure in the oil still/surge vessel 116 and the mass quantity of refrigerant inside the oil still/surge vessel 116 during an ice building time period.

When activated during a second time period, a liquid refrigerant pump 120 supplies the pumped liquid supply line 122 with refrigerant liquid which then travels to the evaporator coils of the load heat exchanger 123 within the load unit 108 of the thermal energy storage and cooling system. Low-pressure refrigerant returns from the evaporator coils of the load heat exchanger 123 via wet suction return 124 to an accumulator or universal refrigerant management vessel (URMV) 146. Simultaneously, the partially distilled oil enriched refrigerant flows out the bottom of the oil still/surge vessel 116 through an oil return capillary 148 and is re-introduced into the dry suction return 114 with the low-pressure vapor exiting the universal refrigerant management vessel 146 and returns to the air conditioner unit 102. The oil return capillary 148 controls the rate at which oil-rich refrigerant exits the oil still/surge vessel 116. The oil return capillary, which is also heated by the warm high-pressure liquid refrigerant inside the high-pressure liquid supply line 112, permits the return of oil to the oil sump inside compressor 110.

Additionally, the wet suction return 124 connects with the upper header assembly 154 that connects with bifurcator 130 to supply low-pressure refrigerant to the system from the mixed-phase regulator 132. The mixed-phase regulator 132 meters the flow of refrigerant within the system by incorporating a valve (orifice) that pulses open to release liquid-phase refrigerant, only when there is sufficient quantity of liquid within the condenser 111. This mixed-phase regulator 132 reduces superfluous vapor feed (other than flash gas which forms when the pressure of saturated high-pressure liquid decreases) to the universal refrigerant management vessel 146 from the compressor 110, while also dropping the required pressure from the condenser pressure to the evaporator saturation pressure. This results in greater overall efficiency of the system while simplifying the refrigerant management portion 104 of the gravity recirculated or liquid overfeed system. It is therefore beneficial to have a regulated flow controller that can regulate the pressure output, or meter the flow of the refrigerant, by controlling the flow independently of temperature and vapor content of the refrigerant. This pressure, or flow control, is performed without separate feedback from other parts of the system, such as is performed with conventional thermal expansion valves.

The insulated tank 140 contains dual-purpose ice freezing/discharge coils 142 arranged for gravity recirculation and drainage of liquid refrigerant and are connected to an upper header assembly 154 at the top, and to a lower header assembly 156 at the bottom. The upper header assembly 154 and the lower header assembly 156 extend outward through the insulated tank 140 to the refrigeration management unit 104. When refrigerant flows through the ice freezing/discharging coils 142 and header assemblies 154 and 156, the coils act as an evaporator while the fluid/ice 152 (phase change material) solidifies in the insulated tank 140 during one time period. The ice freezing/discharging coils 142 and header assemblies 154 and 156 are connected to the low-pressure side of the refrigerant circuitry and are arranged for gravity or pumped recirculation and drainage of liquid refrigerant. During a second time period, warm vapor-phase refrigerant circulates through the ice freezing/discharging coils 142 and header assemblies 154 and 156 and condenses the refrigerant, while melting the ice.

As heat is transferred from the ice freezing/discharging coils 142 to the surrounding ice, a layer of water forms around the annulus of the individual coils 142. Once this layer of water forms a sufficient envelope around a coil, it begins to act as an insulator between the ice freezing/discharging coils 142 and the ice block. This condition will persist until such a time when the water annulus becomes large enough for considerable water circulation to overcome this localized thermal stratification. In order to compensate for the inability of the system to produce high levels of instantaneous cooling load, the outer surface of the ice block is additionally utilized.

Within the insulated tank 140, the entirety of the water is not frozen during the ice build cycle, and therefore, an amount of water continuously surrounds the block of ice. At the bottom of the tank, this water is very near the freezing point (approximately 33-34° F.), and is drawn into cold water inlet line 166 by a water pump 164 and fed to a secondary heat exchanger 162. Refrigerant, returning from the load heat exchanger 122 (usually an evaporator coil in a cooling duct) is diverted from its normal path of the wet suction return 124 and fed to the secondary heat exchanger 162 via secondary cooling line 170. Here, the warm refrigerant is cooled by water entering from cold water inlet line 166 and condenses, increasing the proportion of liquid in the refrigerant which is then fed through a secondary cooling outlet line 172 to the primary heat exchanger 160. The header configuration drives most of the liquid to the universal refrigerant management vessel 146 and the vapor to the primary heat exchanger 160. This remaining refrigerant vapor is then condensed within the primary heat exchanger 160 in the insulated tank 140. After transferring heat to the refrigerant in the secondary heat exchanger 162, the warmed water is returned to any portion (upper portion depicted) of the insulated tank 140 via warm water return line 168.

The refrigerant management unit 104 includes the universal refrigerant management vessel 146 which functions as an accumulator. The universal refrigerant management vessel 146 is located on the low-pressure side of the refrigerant circuitry and performs several functions. The universal refrigerant management vessel 146 separates the liquid-phase from the vapor-phase refrigerant during the refrigerant energy storage period and again during the cooling period. The universal refrigerant management vessel 146 also provides a static column of liquid refrigerant during the refrigerant energy storage period that sustains gravity circulation through the ice freezing/discharge coils 142 inside the insulated tank 140. The dry suction return 114 provides low-pressure vapor-phase refrigerant to compressor 110, within the air conditioner unit 102, during a first thermal energy storage time period from an outlet at the top of the universal refrigerant management vessel 146. A wet suction return 124 is provided through an inlet in the top of the upper header assembly 154 for connection to an evaporator (load heat exchanger 123) during the second time period when the refrigerant energy storage system provides cooling.

The first time period is the refrigerant energy storage time period in which sensible heat and latent heat are removed from water causing the water to freeze. The output of the compressor 110 is high-pressure refrigerant vapor that is condensed to form high-pressure liquid. A valve (not shown) on the outlet of the liquid refrigerant pump 120 (in the pumped liquid supply line 122) controls the connection to the load unit 108, for example closing the connection when the liquid refrigerant pump is stopped.

During the first time period, heat flows from high-pressure warm liquid to the low-pressure cold liquid inside the oil still/surge vessel 116 which boils the cold liquid. The pressure rise resulting from the vapor that forms during liquid boiling inside the oil still/surge vessel 116 causes the cold liquid to exit the oil still/surge vessel 116 and moves it to the ice freezing/discharge coils 142 where it is needed for proper system operation during the first time period. During the second time period, warm high-pressure liquid no longer flows through the high-pressure liquid supply line 112 because the compressor 110 inside air conditioner unit 102 is off. Therefore, the aforementioned heat flow from warm liquid to cold liquid ceases. This cessation permits liquid from the universal refrigerant management vessel 146 and ice freezing/discharge coils to flow back into the oil still/surge vessel 116 because the high internal vessel gas pressure during the first time period no longer exists.

During the thermal energy storage period, high-pressure liquid refrigerant flows from the air conditioner unit 102 to an internal heat exchanger, which keeps all but a small amount of low-pressure liquid refrigerant out of the oil still/surge vessel 116. The refrigerant that is inside the vessel boils at a rate determined by two capillary tubes (pipes). One capillary is the vent capillary 128 that controls the level of refrigerant in the oil still/surge vessel 116. The second, the oil return capillary 148, returns oil-enriched refrigerant to the compressor 110 within the air conditioner unit 102 at a determined rate. The column of liquid refrigerant in the universal refrigerant management vessel 146 is acted on by gravity and positioning the oil still/surge vessel 116 near the bottom of the universal refrigerant management vessel 146 column maintains a steady flow of supply liquid refrigerant to the oil still/surge vessel 116 and into the thermal energy storage unit 106. The surge function allows excess refrigerant during the cooling period to be drained from the ice freezing/discharging coils 142 that are in the insulated tank 140, keeping the surface area maximized for condensing refrigerant during the second time period.

The physical positioning of the oil still/surge vessel 116, in reference to the rest of the system, is a performance factor as an oil still and as a surge vessel. This oil still/surge vessel 116 additionally provides the path for return of the oil that migrates with the refrigerant that must return to the compressor 110. The slightly subcooled (cooler than the vapor-to-liquid phase temperature of the refrigerant) high-pressure liquid refrigerant that exits the oil still/surge vessel 116 flows through a mixed-phase regulator 132 during which a pressure drop occurs.

As stated above, the refrigerant management unit 104 receives high-pressure liquid refrigerant from the air conditioner unit 102 via a high-pressure liquid supply line 112. The high-pressure liquid refrigerant flows through the heat exchanger within the oil still/surge vessel 116, where it is slightly subcooled, and then flows to the mixed-phase regulator 132, where the refrigerant pressure drop takes place. The use of a mixed-phase regulator 132 provides many favorable functions besides liquid refrigerant pressure drop. The mass quantity of refrigerant that passes through the mixed-phase regulator 132 matches the refrigerant boiling rate inside the ice making coils 142 during the thermal energy storage time period, thereby, eliminating the need for a refrigerant level control.

The mixed-phase regulator 132 passes liquid refrigerant, but closes when sensing vapor. The existence of vapor on the low side of the regulator creates pressure to close the valve which combines with the other forces acting upon the piston, to close the piston at a predetermined trigger point that corresponds to desired vapor content. This trigger point may be predetermined by regulator design (e.g., changing the geometry of the regulator components as well as the materials). The trigger point may also be adjusted by automatic or manual adjustments to the regulator geometry (e.g., threaded adjustment to the piston displacement limits).

The pulsing action created in the refrigerant exiting the mixed-phase regulator 132 as a result of the opening and closing of the mixed-phase regulator 132 creates a pulsing effect upon the liquid refrigerant that creates a pressure wave within the closed column in the universal refrigerant management vessel 146. This agitates the liquid refrigerant in both the ice making coils 142 and the condenser 111 during the thermal energy storage first time period, and enhances heat transfer as well as assists in segregating liquid and vapor-phase refrigerant. The mixed-phase regulator 132, in conjunction with the universal refrigerant management vessel 146, also drains the air conditioner unit 102 of liquid refrigerant during the first time period keeping its condensing surface area free of liquid condensate and therefore available for condensing. The mixed-phase regulator 132 allows head pressure of the air-cooled air conditioner unit 102 to float with ambient temperature. The system does not require a superheat circuit, which is necessary with most condensing units connected to a direct expansion refrigeration device.

The low-pressure mixed-phase refrigerant that leaves the mixed-phase regulator 132 passes through a bifurcator 130 to an eductor (or injector nozzle), located between the inlet, to the universal refrigerant management vessel 146 and the upper header assembly 154 of the ice making coils 142, to assist with gravity refrigerant circulation. During the refrigerant thermal energy storage time period, the eductor creates a drop in pressure immediately upstream from the eductor, and in the upper header assembly 154 of the thermal energy storage unit 106, as the refrigerant leaves the bifurcator 130, thereby increasing the rate of refrigerant circulation in the ice making coils 142 while simultaneously improving system performance.

The mixed-phase regulator 132 also reacts to changes in refrigerant mass flow from compressor 110 as the pressure difference across its outlet port varies with increasing or decreasing outdoor ambient air temperatures. This allows the condensing pressure to float with the ambient air temperature. As the ambient air temperature decreases, the head pressure at the compressor 110 decreases which reduces energy consumption and increases compressor 110 capacity. The mixed-phase regulator 132 allows liquid refrigerant to pass while closing a piston upon sensing vapor. Therefore, the mixed-phase regulator 132 temporarily holds the vapor-phase mixture in a "trap". Upon sensing high-pressure liquid, the piston lifts from its seat which allows liquid to pass.

The mixed-phase regulator 132 therefore, allows vapor pressure to convert high-pressure liquid refrigerant to low-pressure liquid refrigerant and flash vapor. The vapor held back by the mixed-phase regulator 132 increases the line pressure back to the condenser 111 and is further condensed into a liquid. The mixed-phase regulator 132 is self regulating and has no parasitic losses. Additionally, the mixed-phase regulator 132 improves the efficiency of the heat transfer in the coils of the heat exchangers by removing vapor out of the liquid and creating a pulsing action on both the low-pressure and high-pressure sides of the system. As stated above, the mixed-phase regulator opens to let low-pressure liquid through and then closes to trap vapor on the high-pressure side and creates a pulsing action on the low-pressure side of the regulator. This pulsing action wets more of the inside wall of the heat exchanger at the boiling and condensing level, which aids in the heat transfer.

The low-pressure mixed-phase refrigerant enters the universal refrigerant management vessel 146 and the liquid and vapor components are separated by gravity with liquid falling to the bottom and vapor rising to the top. The liquid component fills the universal refrigerant management vessel 146 to a level determined by the mass charge of refrigerant in the system, while the vapor component is returned to the compressor of the air conditioner unit 102. In a normal direct expansion cooling system, the vapor component circulates throughout the system reducing efficiency. With the embodiment depicted in FIG. 1, the vapor component is returned to the compressor 110 directly without having to pass though the evaporator. The column of liquid refrigerant in the universal refrigerant management vessel 146 is acted upon by gravity and has two paths during the thermal energy storage time period. One path is to the oil still/surge vessel 116 where the rate is metered by capillary tubes 128 and 148.

The second path for the column of liquid refrigerant is to the lower header assembly 156, through the ice freezing/discharge coils 142 and the upper header assembly 154, and back to the compressor 110 through the universal refrigerant management vessel 146. This gravity assisted circulation stores thermal capacity in the form of ice when the tank is filled with a phase-change fluid such as water. The liquid static head in the universal refrigerant management vessel 146 acts as a pump to create a flow within the ice freezing/discharge coils 142. As the refrigerant becomes a vapor, the level of liquid in the coil is forced lower than the level of the liquid in the universal refrigerant management vessel 146, and therefore, promotes a continuous flow between the universal refrigerant management vessel 146 through ice freezing/discharge coils 142. This differential pressure between the universal refrigerant management vessel 146 and the ice freezing/discharge coils 142 maintains the gravity circulation. Initially vapor only, and later (in the storage cycle), both refrigerant liquid and vapor, are returned to the universal refrigerant management vessel 146 from the upper header assembly 154.

As refrigerant is returned to the universal refrigerant management vessel 146 the heat flux gradually diminishes due to increasing ice thickness (increasing thermal resistance). The liquid returns to the universal refrigerant management vessel 146 within the refrigerant management unit 104 and the vapor returns to the compressor 110 within the air conditioner unit 102. Gravity circulation assures uniform building of the ice. As one of the ice freezing/discharge coils 142 builds more ice, its heat flux rate is reduced. The coil next to it now receives more refrigerant until all coils have a nearly equal heat flux rate.

The design of the ice freezing/discharge coils 142 creates an ice build pattern that maintains a high compressor suction pressure (therefore an increased suction gas density) during the ice build storage (first) time period. During the final phase of the thermal energy storage (first) time period, all remaining interstices between each ice freezing/discharge coil 142 become closed with ice, therefore the remaining water to ice surface area decreases, and the suction pressure drops dramatically. This drop on suction pressure can be used as a full charge indication that automatically shuts off the condensing unit with an adjustable refrigerant pressure switch.

When the air conditioner unit 102 turns on during the thermal energy storage first time period, low-pressure liquid refrigerant is prevented from passing through the liquid refrigerant pump 120 by gravity, and from entering the load heat exchanger 123 by a poppet valve (not shown) in the pumped liquid supply line 122. When the thermal energy storage system is fully charged, and the air conditioning unit 102 shuts off, the mixed-phase regulator 132 allows the refrigerant system pressures to equalize quickly. This rapid pressure equalization permits use of a high efficiency, low starting torque motor in the compressor 110. The load heat exchanger 123 is located either above or below the thermal energy storage unit 106 so that refrigerant may flow from the load heat exchanger 123 (as mixed-phase liquid and vapor), or through the wet suction return 124 (as vapor only at saturation), to the upper header assembly 154. After passing through the upper header assembly 154 it then passes into the ice freezing/discharge coils for condensing back to a liquid.

As shown in FIG. 1, an embodiment of a high efficiency refrigerant energy storage and cooling system is depicted comprising the five major components that define the system. The air conditioner unit 102 is a conventional condensing unit that utilizes a compressor 110 and a condenser 111 to produce high-pressure liquid refrigerant delivered through a high-pressure liquid supply line 112 to the refrigeration management unit 104. The refrigeration management unit 104 is connected to a thermal energy storage unit 106 comprising an insulated tank 140 filled with water and ice-making coils 142. Finally, a secondary heat exchanger unit 162 introduces external melt capability providing additional instantaneous cooling load to the system. The air conditioner unit 102, the refrigeration management unit 104 and the thermal energy storage unit 106 act in concert to provide efficient multi-mode cooling to the load heat exchanger 108 (indoor cooling coil assembly) and thereby perform the functions of the principal modes of operation of the system. The circulation loop created with the secondary heat exchanger 162 transfers heat between the refrigerant leaving the load heat exchanger 123 and the fluid within the insulated tank 140. This loop acts to circulate and destratify fluid 152 within the insulated tank 140 and draw heat from refrigerant leaving the load heat exchanger 123. This secondary heat exchanger loop can be switched in and out of the system by valves 188 as necessary when instantaneous cooling load is needed. The system shown is known as an internal/external melt system because the thermal energy that has been stored in the form of ice is melted internally to the block by freezing/discharging coils 142 and externally by circulating cold water from the periphery of the block through a secondary heat exchanger 162. This secondary heat exchanger loop can be switched in and out of the system by valves 188 as necessary when instantaneous cooling load is needed.

Figure 2:
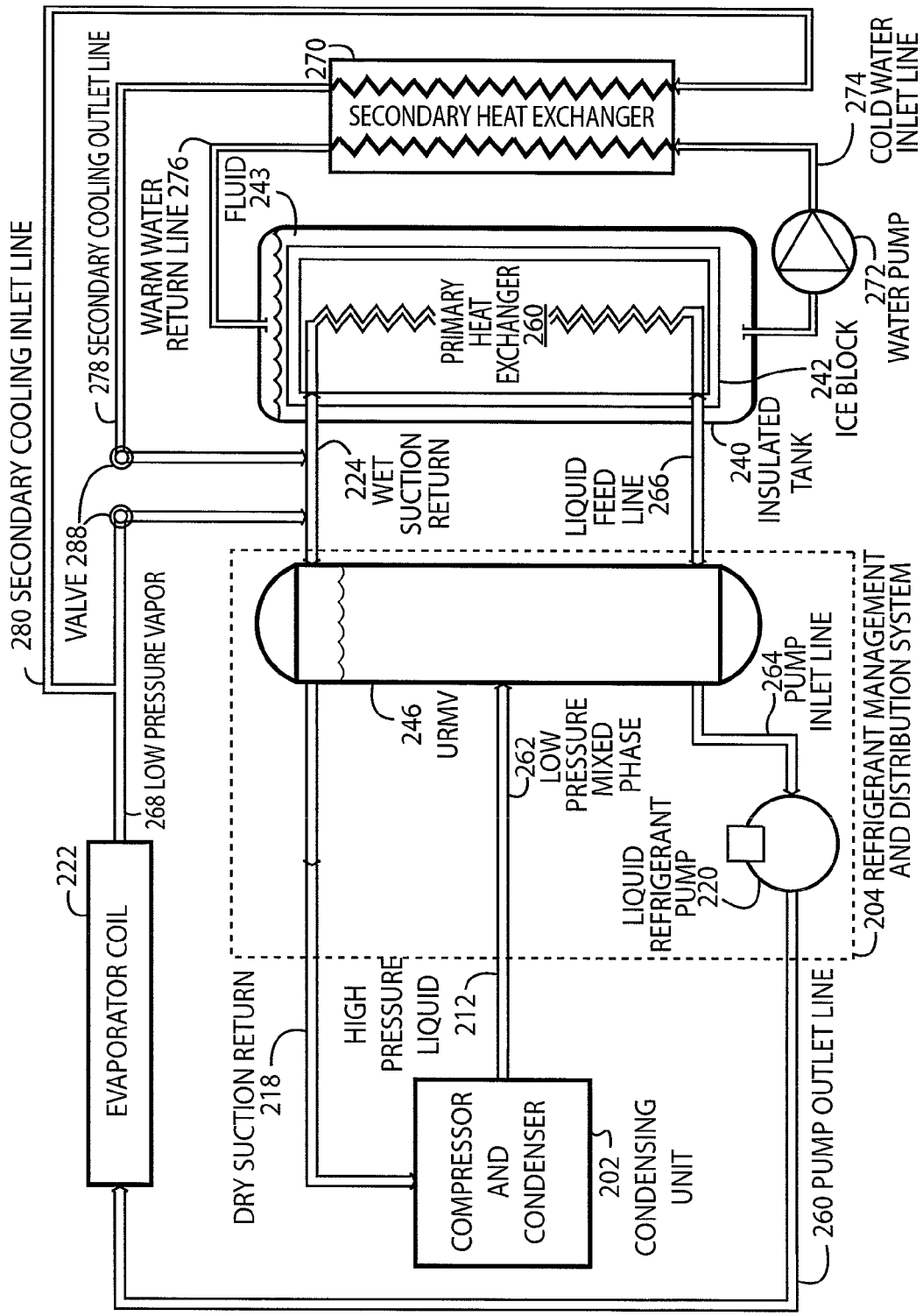
FIG. 2 illustrates an embodiment of a refrigerant-based thermal energy storage and cooling system with enhanced heat exchange capability.

FIG. 2 illustrates an embodiment of a refrigerant-based thermal energy storage cooling system with enhanced heat exchange capability. A thermal energy storage and cooling system with a conventional condensing unit 202 (air conditioner) utilizes a compressor and condenser to produce high-pressure liquid refrigerant delivered through a high-pressure liquid supply line 212 to the refrigeration management and distribution system 204 which can include a universal refrigerant management vessel 246 and a liquid refrigerant pump 220. The universal refrigerant management vessel 246 receives the low-pressure mixed phase 262 liquid refrigerant that has been dropped in pressure from the high-pressure liquid supply line 212. Refrigerant is accumulated in a universal refrigerant management vessel 246 that separates the liquid-phase refrigerant from the vapor-phase refrigerant. A mixed-phase regulator (not shown) can be used to minimize vapor feed to the universal refrigerant management vessel 246 from the compressor, while decreasing the refrigerant pressure difference from the condenser to the evaporator saturation pressure.

In thermal energy storage mode, the universal refrigerant management vessel 246 feeds liquid refrigerant through liquid feed line 266 to the primary heat exchanger 260 that stores the cooling (thermal energy) in the form of ice or an ice block 242. Upon delivering the cooling to the primary heat exchanger 260, mixed-phase refrigerant is returned to the universal refrigerant management vessel 246 via a wet suction return line 224. Dry suction return line 218 returns vapor phase refrigerant to be compressed and condensed in the condensing unit 202 to complete the thermal energy storage cycle.

In cooling mode, the universal refrigerant management vessel 246 feeds liquid refrigerant through pump inlet line 264 to a liquid refrigerant pump 220 which then pumps the refrigerant to an evaporator coil 222 via pump outlet line 260. Upon delivering the cooling to the evaporator coil 222, mixed-phase or saturated refrigerant is returned to the primary heat exchanger 260 via a low-pressure vapor line 268 and is condensed and cooled utilizing an ice block 242 that is made during thermal energy storage mode. The vapor-phase refrigerant is then returned to the universal refrigerant management vessel 246 via liquid feed line 266. A secondary heat exchanger unit 270 introduces an external melt to the system to provide additional instantaneous cooling load to the system. By providing a system with internal/external melt capability, thermal energy stored in the form of an ice block 242 is melted internally by freezing/discharging coils within the primary heat exchanger 260 and externally by circulating cold water from the periphery of the block through the secondary heat exchanger 270. This allows the system to realize as much as a fourfold increase in instantaneous cooling capacity.

During this second time period (cooling mode), warm vapor phase refrigerant circulates through ice freezing/discharging coils within the primary heat exchanger 260 and melts the ice block 242 from the inside out, providing a refrigerant condensing function. As heat is transferred from these ice freezing/discharging coils to the surrounding ice block 242, a layer of water forms around the annulus of the individual coils. As described above, once this layer of water forms a sufficient envelope around a coil, it begins to act as an insulator between the ice freezing/discharging coils and the ice block 242. This condition will persist until such a time when the water annulus becomes large enough for considerable water circulation to overcome this localized thermal stratification. In order to compensate for the inability of the system to produce high levels of instantaneous cooling load, the outer surface of the ice block is additionally utilized.

Within the insulated tank 240, the entirety of the water is not frozen during the ice build cycle, and therefore, an amount of water continuously surrounds the block of ice. At the bottom of the insulated tank 240, this water is very near the freezing point (approximately 33-34° F.), and is drawn into cold water line 274 by a water pump 272 and fed to the secondary heat exchanger 270. Refrigerant, returning from the evaporator coil 222 can be diverted from its normal path of the wet suction return 224 and fed to the secondary heat exchanger 270 via secondary cooling inlet line 278. Here, the warm refrigerant is cooled by water entering from cold water line 274 and condenses, increasing the proportion of liquid in the refrigerant which is then fed through a secondary cooling outlet line 280 to the primary heat exchanger 260 where the header configuration drives most of the liquid to the universal refrigerant management vessel 246 and the vapor to the primary heat exchanger 260. This remaining refrigerant vapor is then condensed within the primary heat exchanger 260 in the insulated tank 240. After transferring heat to the refrigerant in the secondary heat exchanger 270, the warmed water is returned to the upper portion of the insulated tank 240 via warm water return line 276. This secondary heat exchanger loop can be switched in and out of the system by valves 288 as necessary when instantaneous cooling load is needed. Additionally, a secondary cooling source (not shown), such as an external cold water line or the like, may be placed in thermal contact with the refrigerant in the secondary heat exchanger to additionally boost the pre-cooling of the refrigerant entering the primary heat exchanger 260 or the URMV 246.

Figure 3:
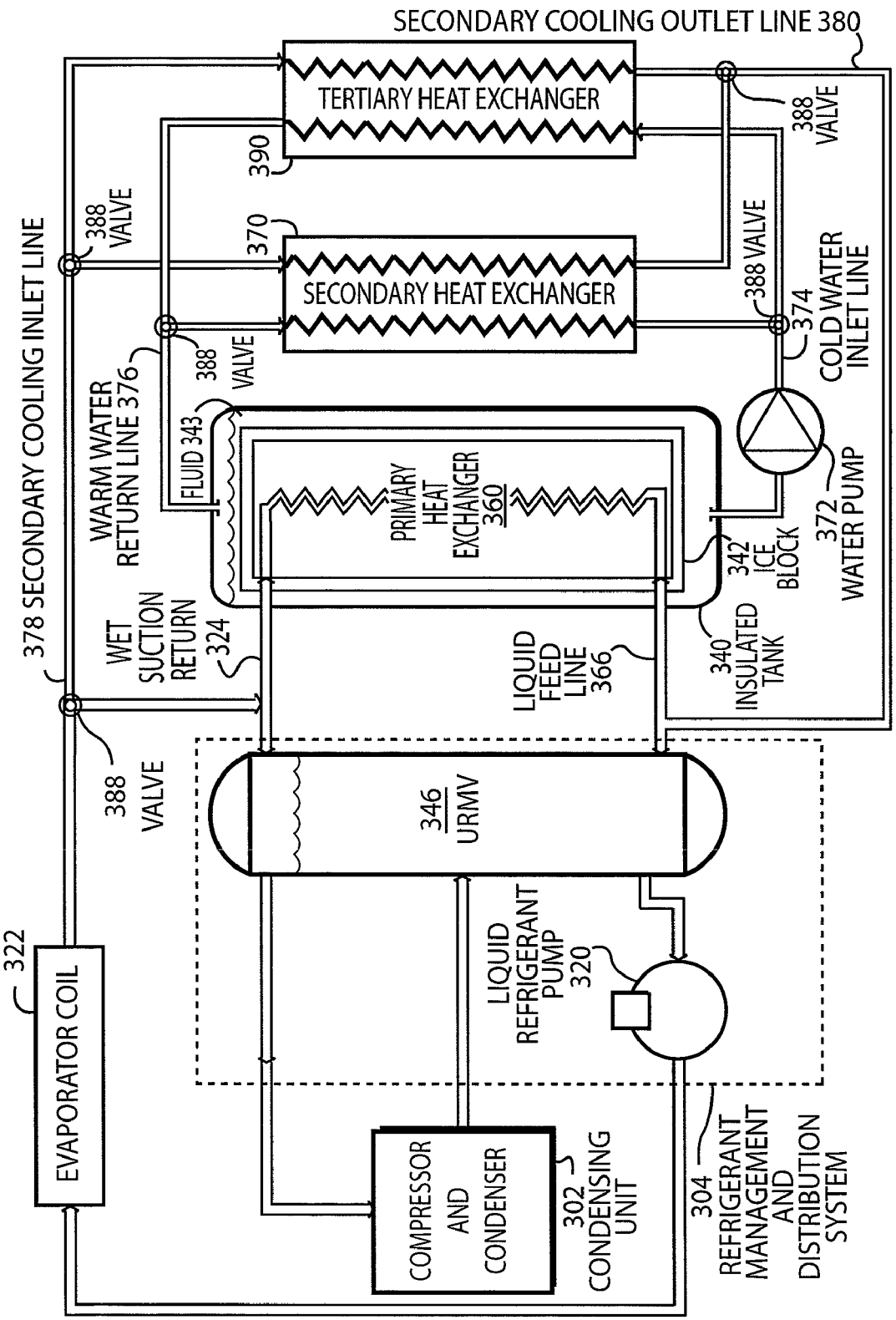
FIG. 3 illustrates an embodiment of a refrigerant-based thermal energy storage and cooling system with multiple enhanced heat exchangers.

FIG. 3 illustrates an embodiment of a refrigerant-based thermal energy storage and cooling system with multiple enhanced heat exchanger capability. Similarly, as is detailed above in the previous Figures, a thermal energy storage and cooling system with a conventional condensing unit 302 (air conditioner) utilizes a compressor and condenser to produce high-pressure liquid refrigerant delivered through a high-pressure liquid supply line to the refrigeration management and distribution system 304 which can include a universal refrigerant management vessel 346 and a liquid refrigerant pump 320. A mixed-phase flow regulator (not shown) may be used to receive high-pressure liquid refrigerant from the high-pressure liquid supply line and regulate the flow of refrigerant fed from the compressor to the heat load. Low-pressure mixed-phase refrigerant is accumulated in a universal refrigerant management vessel 346 that separates the liquid phase from the vapor phase refrigerant.

In thermal energy storage mode, the universal refrigerant management vessel 346 feeds liquid refrigerant through a liquid line feed to the primary heat exchanger 360 that stores the cooling in the form of ice or an ice block 342. Upon delivering the cooling to the primary heat exchanger 360, mixed-phase refrigerant is returned to the universal refrigerant management vessel 346 via a wet suction return line 324. A dry suction return line returns vapor phase refrigerant to be compressed and condensed in the condensing unit 302 to complete the thermal energy storage cycle.

In cooling mode, the universal refrigerant management vessel 346 feeds liquid refrigerant to a liquid refrigerant pump 320, which then pumps the refrigerant to an evaporator coil 322. Upon delivering the cooling to the evaporator coil 322, mixed-phase refrigerant is returned to the primary heat exchanger 360 and cooled utilizing an ice block 342 that is made during thermal energy storage mode. The vapor phase refrigerant is condensed into liquid by the ice cooling, and returned to the universal refrigerant management vessel 346 via liquid feed line 366. A secondary heat exchanger unit 370 and a tertiary heat exchanger unit 390 introduce an external melt to the system to provide additional instantaneous cooling load to the system.

By providing a system with internal/external melt capability, thermal energy stored in the form of an ice block 342 is melted internally by freezing/discharging coils within the primary heat exchanger 360 and externally by circulating cold water from the periphery of the block through the secondary and tertiary heat exchangers 370 and 390. This allows the system to react to very large instantaneous cooling demands. Additional heat exchange units can be added to the system in the manner of tertiary heat exchanger 390 to regulate a wide variety of cooling load demands. During this second time period (cooling mode), warm vapor phase refrigerant circulates through ice freezing/discharging coils within the primary heat exchanger 360 and melts the ice block 342 from the inside out providing a refrigerant condensing function.

Water at the bottom of the insulated tank 340 is drawn into cold water line 374 by a water pump 372 and fed to the secondary and tertiary heat exchangers 370 and 390. Refrigerant, returning from the evaporator coil 322 can be diverted from its normal path of the wet suction return 324 and fed to the secondary and tertiary heat exchangers 370 and 390 via secondary cooling inlet line 378. Here, the warm refrigerant is cooled by water entering from cold water line 374 and condenses, increasing the proportion of liquid in the refrigerant which is then fed through a secondary cooling outlet line 380 to the primary heat exchanger 360 where the header configuration drives most of the liquid to the universal refrigerant management vessel 346 and the vapor to the primary heat exchanger 360. This remaining refrigerant vapor is then condensed within the primary heat exchanger 360 in the insulated tank 340. After transferring heat to the refrigerant in the secondary and tertiary heat exchangers 370 and 390, the warmed water is returned to the upper portion of the insulated tank 340 via warm water return line 376. These secondary and tertiary heat exchanger loops can be switched in and out of the system by valves 388 as necessary when instantaneous cooling load is needed. A plurality of additional heat exchangers can be added to the system in a similar manner to the tertiary heat exchanger in series or parallel to accomplish additional enthalpy reduction of the refrigerant if needed.

Figure 4:
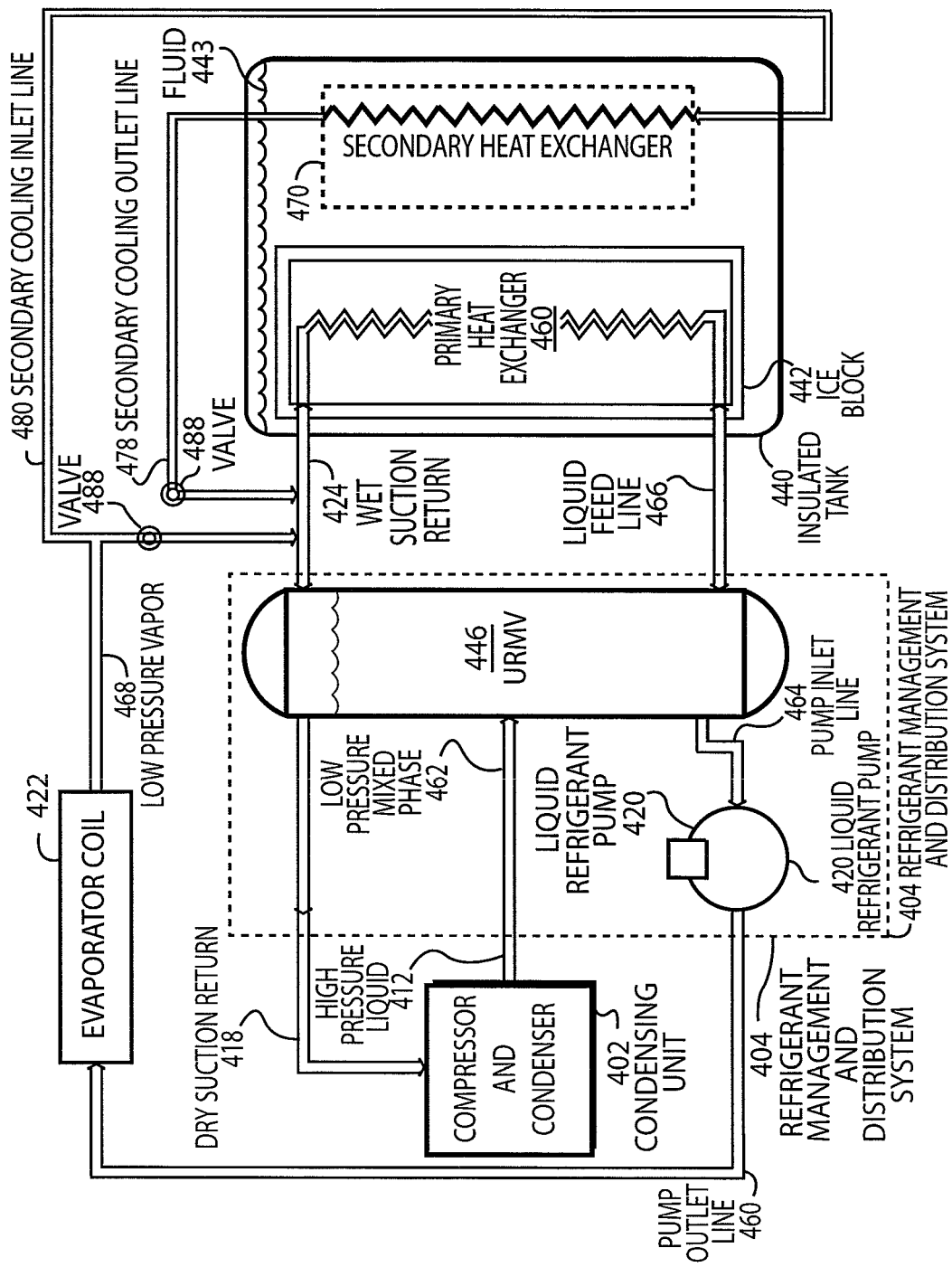
FIG. 4 illustrates an embodiment of a refrigerant-based thermal energy storage and cooling system with enhanced heat exchange capability utilizing a shared fluid bath.

FIG. 4 illustrates an embodiment of a refrigerant-based thermal energy storage cooling system with enhanced heat exchange capability utilizing a shared fluid bath. A thermal energy storage and cooling system with a conventional condensing unit 402 (air conditioner) utilizes a compressor and condenser to produce high-pressure liquid refrigerant delivered through a high-pressure liquid supply line 412 to the refrigeration management and distribution system 404 which can include a universal refrigerant management vessel 446 and a liquid refrigerant pump 420. The universal refrigerant management vessel 446 receives the low-pressure mixed phase 462 liquid refrigerant that has been dropped in pressure from the high-pressure liquid supply line 412. Refrigerant is accumulated in the universal refrigerant management vessel 446 that separates the liquid-phase refrigerant from the vapor-phase refrigerant. Low-pressure mixed-phase refrigerant 462 is accumulated in a universal refrigerant management vessel 446 that separates the liquid-phase refrigerant from the vapor-phase refrigerant. A mixed-phase regulator (not shown) can be used to minimize vapor feed to the universal refrigerant management vessel 446 from the compressor, while decreasing the refrigerant pressure difference from the condenser to the evaporator saturation pressure.

In thermal energy storage mode, the universal refrigerant management vessel 446 feeds liquid refrigerant through liquid feed line 466 to the primary heat exchanger 460 that stores the cooling (thermal energy) in the form of ice or an ice block 442. Upon delivering the cooling to the primary heat exchanger 460, mixed-phase refrigerant is returned to the universal refrigerant management vessel 446 via a wet suction return line 424. Dry suction return line 418 returns vapor phase refrigerant to be compressed and condensed in the condensing unit 402 to complete the thermal energy storage cycle.

In cooling mode, the universal refrigerant management vessel 446 feeds liquid refrigerant through pump inlet line 464 to a liquid refrigerant pump 420 which then pumps the refrigerant to an evaporator coil 422 via pump outlet line 460. Upon delivering the cooling to the evaporator coil 422, mixed-phase or saturated refrigerant is returned to the primary heat exchanger 460 via a low-pressure vapor line 468 and is condensed and cooled utilizing an ice block 442 that is made during thermal energy storage mode. The vapor-phase refrigerant is then returned to the universal refrigerant management vessel 446 via liquid feed line 466. A secondary heat exchanger unit 470, located within the fluid 443 that is contained inside of the insulated tank 440 but outside of the ice block 442, may be used to introduce an external melt and provide additional instantaneous cooling load to the system in a serial configuration. By providing a system with internal/external melt capability, thermal energy stored in the form of an ice block 442 is melted internally by freezing/discharging coils within the primary heat exchanger 460 and externally by circulating/and or contacting fluid from the periphery of the block with the secondary heat exchanger 470. This allows the system to realize increased instantaneous cooling capacity in a simple and self contained manner. An additional circulating pump or air pump may be utilized to destratify and mix the fluid within the chamber.

During this second time period (cooling mode), warm vapor phase refrigerant circulates through ice freezing/discharging coils within the primary heat exchanger 460 and melts the ice block 442 from the inside out, providing a refrigerant condensing function. As heat is transferred from these ice freezing/discharging coils to the surrounding ice block 442, a layer of water forms around the annulus of the individual coils. As described above, once this layer of water forms a sufficient envelope around a coil, it begins to act as an insulator between the ice freezing/discharging coils and the ice block 442. This condition will persist until such a time when the water annulus becomes large enough for considerable water circulation to overcome this localized thermal stratification. In order to compensate for the inability of the system to produce high levels of instantaneous cooling load, the outer surface of the ice block is additionally utilized.

Within the insulated tank 440, the entirety of the water is not frozen during the ice build cycle, and therefore, an amount of water continuously surrounds the block of ice. At the bottom of the insulated tank 440, this water is very near the freezing point (approximately 33-34° F.), and is used to contact the secondary heat exchanger 470 located within the fluid 443. Refrigerant, returning from the evaporator coil 422 can be diverted from its normal path of the wet suction return 424 and fed to the secondary heat exchanger 470 via secondary cooling inlet line 480. Here, the warm refrigerant is cooled by water surrounding the ice block 442 and condenses, increasing the proportion of liquid in the refrigerant which is then fed through a secondary cooling outlet line 480 to the primary heat exchanger 460 where the header configuration drives most of the liquid to the universal refrigerant management vessel 446 and the vapor to the primary heat exchanger 460. This remaining refrigerant vapor is then condensed within the primary heat exchanger 460 in the insulated tank 440. After transferring heat to the refrigerant in the secondary heat exchanger 470, the warmed water is circulated and mixed within the insulated tank 440. This secondary heat exchanger loop can be switched in and out of the system by valves 488 as necessary when instantaneous cooling load is needed.

Figure 5:
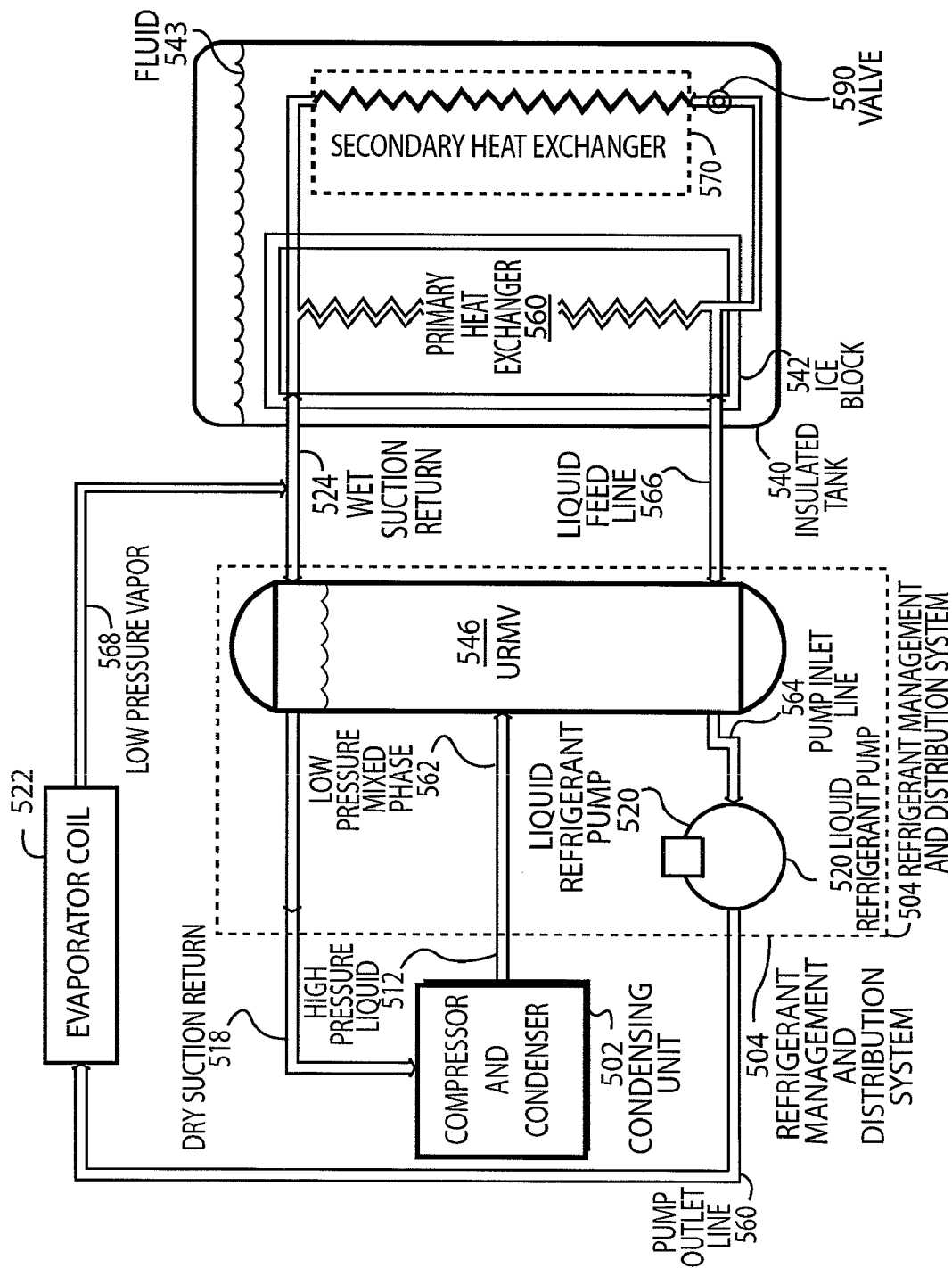
FIG. 5 illustrates an embodiment of a refrigerant-based thermal energy storage and cooling system with enhanced heat exchange capability utilizing a shared fluid bath.

FIG. 5 illustrates an embodiment of a refrigerant-based thermal energy storage cooling system with enhanced heat exchange capability utilizing a shared fluid bath. A thermal energy storage and cooling system with a conventional condensing unit 502 (air conditioner) utilizes a compressor and condenser to produce high-pressure liquid refrigerant delivered through a high-pressure liquid supply line 512 to the refrigeration management and distribution system 504 which can include a universal refrigerant management vessel 546 and a liquid refrigerant pump 520. The universal refrigerant management vessel 546 receives the low-pressure mixed phase 562 liquid refrigerant that has been dropped in pressure from the high-pressure liquid supply line 512. Refrigerant is accumulated in the universal refrigerant management vessel 546 that separates the liquid-phase refrigerant from the vapor-phase refrigerant. Low-pressure mixed-phase refrigerant 562 is accumulated in a universal refrigerant management vessel 546 that separates the liquid-phase refrigerant from the vapor-phase refrigerant. A mixed-phase regulator (not shown) can be used to minimize vapor feed to the universal refrigerant management vessel 546 from the compressor, while decreasing the refrigerant pressure difference from the condenser to the evaporator saturation pressure.

In thermal energy storage mode, the universal refrigerant management vessel 546 feeds liquid refrigerant through liquid feed line 566 to the primary heat exchanger 560 that stores the cooling (thermal energy) in the form of ice or an ice block 542. Upon delivering the cooling to the primary heat exchanger 560, mixed-phase refrigerant is returned to the universal refrigerant management vessel 546 via a wet suction return line 524. Dry suction return line 518 returns vapor phase refrigerant to be compressed and condensed in the condensing unit 502 to complete the thermal energy storage cycle.

In cooling mode, the universal refrigerant management vessel 546 feeds liquid refrigerant through pump inlet line 564 to a liquid refrigerant pump 520 which then pumps the refrigerant to an evaporator coil 522 via pump outlet line 560. Upon delivering the cooling to the evaporator coil 522, mixed-phase or saturated refrigerant is returned to the primary heat exchanger 560 via a low-pressure vapor line 568 and is condensed and cooled utilizing an ice block 542 that is made during thermal energy storage mode. The vapor-phase refrigerant is then returned to the universal refrigerant management vessel 546 via liquid feed line 566. A secondary heat exchanger unit 570, located within the fluid 543 that is contained inside of the insulated tank 540 but outside of the ice block 542, may be used to introduce an external melt and provide additional instantaneous cooling load to the system in a parallel configuration. By providing a system with simultaneous internal and external melt capability, thermal energy stored in the form of an ice block 542 is melted internally by freezing/discharging coils within the primary heat exchanger 560 and externally by circulating/and or contacting fluid from the periphery of the block with the secondary heat exchanger 570. This allows the system to realize increased instantaneous cooling capacity in a simple and self contained manner. An additional circulating pump or air pump may be utilized to destratify and mix the fluid within the chamber.

During this second time period (cooling mode), warm vapor phase refrigerant circulates through ice freezing/discharging coils within the primary heat exchanger 560 and melts the ice block 542 from the inside out, providing a refrigerant condensing function. As heat is transferred from these ice freezing/discharging coils to the surrounding ice block 542, a layer of water forms around the annulus of the individual coils. As described above, once this layer of water forms a sufficient envelope around a coil, it begins to act as an insulator between the ice freezing/discharging coils and the ice block 542. This condition will persist until such a time when the water annulus becomes large enough for considerable water circulation to overcome this localized thermal stratification. In order to compensate for the inability of the system to produce high levels of instantaneous cooling load, the outer surface of the ice block is additionally utilized.

Within the insulated tank 540, the entirety of the water is not frozen during the ice build cycle, and therefore, an amount of water continuously surrounds the block of ice. At the bottom of the insulated tank 540, this water is very near the freezing point, and is used to contact the secondary heat exchanger 570 located within the fluid 543. Refrigerant, returning from the evaporator coil 522 can be diverted from its normal path of the wet suction return 524 and fed simultaneously to the secondary heat exchanger 570 and the primary heat exchanger 560 via secondary cooling inlet line 580. Here, the warm refrigerant is cooled by water surrounding the ice block 542 by secondary heat exchanger 570 and the primary heat exchanger 560 within the ice block 542 and condenses. The header configuration then drives most of the liquid to the universal refrigerant management vessel 546 and the vapor to the primary heat exchanger 560 and the secondary heat exchanger 570. Remaining refrigerant vapor is eventually condensed within the primary heat exchanger 560 in the insulated tank 540. After transferring heat to the refrigerant in the secondary heat exchanger 570, the warmed water is circulated and mixed within the insulated tank 540. This secondary heat exchanger loop can be switched in and out of the system by valve 590 as necessary when instantaneous cooling load is needed.

Conventional thermal energy storage units that utilize a refrigerant-based, internal melt, ice on coil system, are constrained by a cooling load capacity that is limited by the heat transfer coefficient of the ice melt. In such a system, a condensing unit is used to store refrigerant energy during one time period in the form of ice (ice build), and provide cooling from the stored ice energy during a second time period (ice melt). This melt process typically starts on the outside of a heat transfer tube of a heat exchanger that is imbedded within the block of ice, through which warm refrigerant flows. As heat is transferred through the heat exchanger to the ice, an annulus of water forms between the tubes and the ice, and in the absence of circulation, acts as an insulator to further heat transfer. Thus, the capacity of the heat exchanger is limited in the early stages of the melt prior to a time when a large enough water annulus allows mixing of the water in the area of the ice block. Previous attempts to improve heat transfer between a heat transfer tube that is surrounded by ice have involved creating turbulence by bubbling air in the jacket of water. This method is limited by poor efficiency, reliability and high cost (both energy and dollars).

The present invention overcomes the disadvantages and limitations of the prior art by providing a method and device to increase the cooling load that can be provided by a refrigerant-based thermal energy storage and cooling system with an improved arrangement of heat exchangers. This is accomplished by circulating cold water surrounding a block of ice, used as the thermal energy storage medium, through a secondary heat exchanger where it condenses refrigerant vapor returning from a load. The refrigerant is then circulated through a primary heat exchanger within the block of ice where it is further cooled and condensed. This system is known as an internal/external melt system because the thermal energy, stored in the form of ice, is melted internally by a primary heat exchanger and externally by circulating cold water from the periphery of the block through a secondary heat exchanger.

In a typical ice storage unit, the water in the tank that surrounds the periphery of the ice never freezes solid. This water remains approximately 32° F. at the bottom of the tank for nearly the entirety of the melt period. By circulating this water through a secondary heat exchanger and then back into the tank with a small circulation pump, greater heat exchange efficiencies can be realized. The secondary heat exchanger is a high-efficiency heat exchanger such as a coaxial condenser or a brazed plate heat exchanger or the like and is used to lower the enthalpy (lower the temperature and/or condense) the refrigerant prior to entering the main heat exchanger in the ice tank. As a result, the total cooling capacity of the system is now the sum of the capacities provided by the two heat exchangers. By using as many of the secondary heat exchangers as needed, the system can provide the flexibility to match the ice storage system to the requirement of the cooling load.

The detailed embodiments detailed above, minimize additional components and use very little energy beyond that used by the condensing unit to store the thermal energy. The refrigerant energy storage design has been engineered to provide flexibility so that it is practicable for a variety of applications. The embodiments can utilize stored energy to provide chilled water for large commercial applications or provide direct refrigerant air conditioning to multiple evaporators. The design incorporates multiple operating modes, the ability to add optional components, and the integration of smart controls that guarantee energy is stored at maximum efficiency. When connected to a condensing unit, the system stores refrigeration energy in a first time period, and utilizes the stored energy during a second time period to provide cooling. In addition, both the condensing unit and the refrigerant energy storage system can operate simultaneously to provide cooling during a third time period.

Numerous advantages are realized in utilizing additional heat exchanger loops to manage coolant in high-efficiency thermal energy storage and cooling systems. The embodiments described can increase the cooling capacity of the system by as much as 400% to match the cooling load required. The system eliminates complicated and expensive air distribution systems that are subject to great reliability concerns and the system can readily adapt to buildings cooled by cold-water distribution. These embodiments have widespread application in all cooling systems, extending beyond applications for air-conditioning. For instance, this method can be used for cooling any fluid medium using ice storage. Combined with an efficient method of making ice, these embodiments can have wide application in dairy, and petroleum industries.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of providing load cooling with a refrigerant-based thermal energy storage and cooling system comprising the steps of:

circulating a refrigerant between a condensing unit and a primary heat exchanger in a primary cooling loop during a first time period;

condensing said refrigerant with said condensing unit; and, expanding said refrigerant in said primary heat exchanger that is constrained within a tank filled with a fluid capable of a phase change between liquid and solid during said first time period to freeze a portion of said fluid within said tank and create a cooled fluid and a frozen fluid;

circulating said refrigerant between said primary heat exchanger and a load heat exchanger in a secondary cooling loop during a second time period;

condensing said refrigerant in said primary heat exchanger utilizing cooling from said frozen fluid;

expanding said refrigerant in a load heat exchanger to provide said load cooling; and, circulating said cooled fluid to a secondary heat exchanger in thermal communication with said secondary cooling loop in said second time period to reduce the enthalpy of said refrigerant in said secondary cooling loop.

2. The method of claim 1 further comprising the steps of:

reducing the pressure of said refrigerant with a refrigerant management unit placed in said primary cooling loop between said condensing unit and said primary heat exchanger;

accumulating said refrigerant in a universal refrigerant management vessel placed in said primary cooling loop.

3. The method of claim 2 further comprising the step of:

reducing the pressure of said refrigerant with a mixed-phase regulator within said refrigerant management unit.

4. The method of claim 2 further comprising the steps of:

circulating said refrigerant from said refrigerant management unit to said secondary heat exchanger;

lowering the enthalpy of said refrigerant with said cooled fluid with said secondary heat exchanger; and, transferring lower enthalpy refrigerant to said load heat exchanger.

5. The method of claim 2 further comprising the steps of:

receiving high enthalpy refrigerant from said load heat exchanger with said primary heat exchanger and said secondary heat exchanger transferring lower refrigerant to said refrigerant management unit.

6. The method of claim 1 further comprising the step of:
pumping said refrigerant with a liquid refrigerant pump to provide said circulation in said primary refrigerant loop.

7. The method of claim 1 further comprising the step of:
circulating said cooled fluid to said secondary heat exchanger in thermal communication with said primary cooling loop in said first time period to reduce the enthalpy of said refrigerant in said primary cooling loop.

8. The method of claim 1 further comprising the step of:
utilizing said thermal energy storage and cooling system to boost said load cooling of an air conditioning system.

9. The method of claim 1 further comprising the step of:
utilizing said thermal energy storage and cooling system to shift at least a portion of the power consumption time period of an air conditioning system.

10. The method of claim 1 further comprising the step of:
excluding said secondary heat exchanger from said secondary cooling loop with at least one valve.

11. The method of claim 1 further comprising the step of:
utilizing a secondary cooling source in thermal communication with said secondary heat exchanger that is placed in thermal contact with said refrigerant to reduce the enthalpy said refrigerant.

12. The method of claim 1 further comprising the step of:
locating said secondary heat exchanger within said tank and in thermal communication with said fluid.

13. The method of claim 1 further comprising the steps of:
receiving said fluid from said secondary heat exchanger with a tertiary heat exchanger that facilitates additional thermal contact between cooled said fluid and said refrigerant to further reduce the enthalpy of a portion of said refrigerant; and,
returning warmed said fluid to said tank.

14. The method of claim 1 further comprising the steps of:
reducing the enthalpy of said refrigerant with a tertiary heat exchanger connected in parallel with said secondary heat exchanger that additionally facilitates thermal contact between cooled said fluid and said refrigerant; and
returning warmed said fluid to said tank.

15. The method of claim 1 further comprising the steps of:
receiving said fluid from said secondary heat exchanger with a plurality of heat exchangers that facilitate additional thermal contact between cooled said fluid and said refrigerant to further reduce the enthalpy of a portion of said refrigerant; and,
returning warmed said fluid to said tank.

16. The method of claim 1 further comprising the steps of:
reducing the enthalpy of said refrigerant with a plurality of heat exchangers connected in parallel with said secondary heat exchanger that additionally facilitates thermal contact between cooled said fluid and said refrigerant; and
returning warmed said fluid to said tank.

* * * * *